May 6, 1941. J. NEUFELD 2,241,154
WELL SURVEYING METHOD AND APPARATUS
Filed Oct. 1, 1938 2 Sheets-Sheet 1
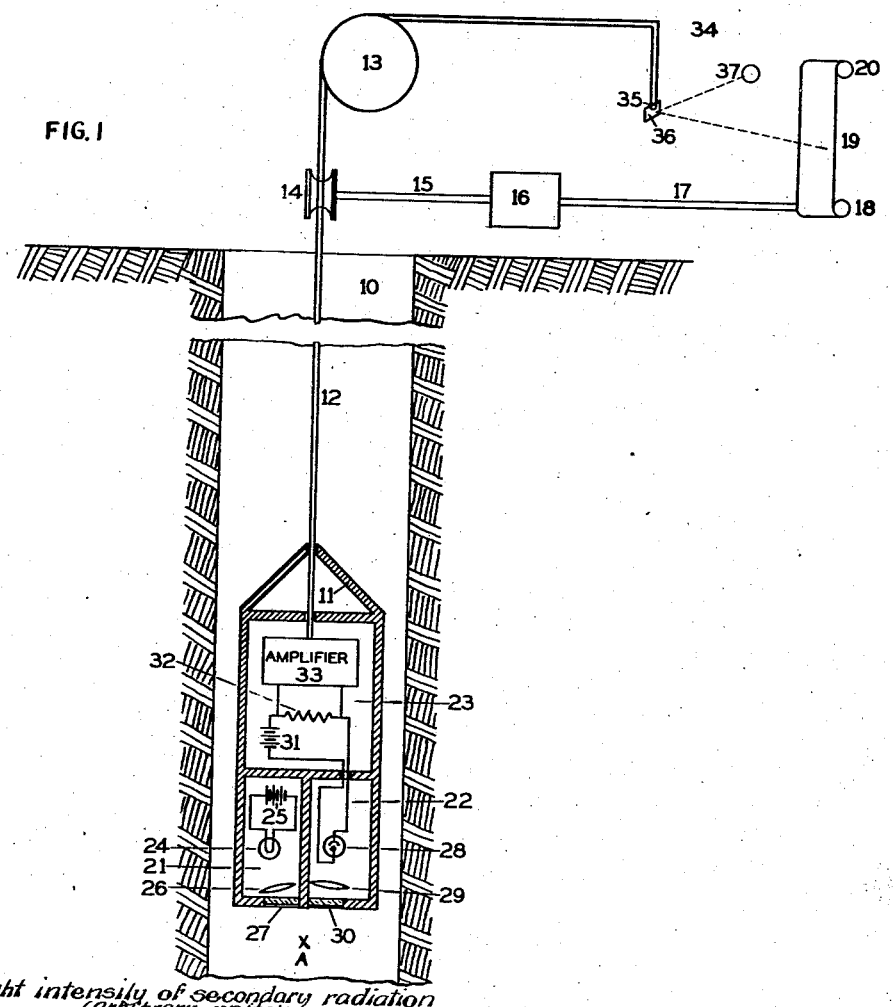
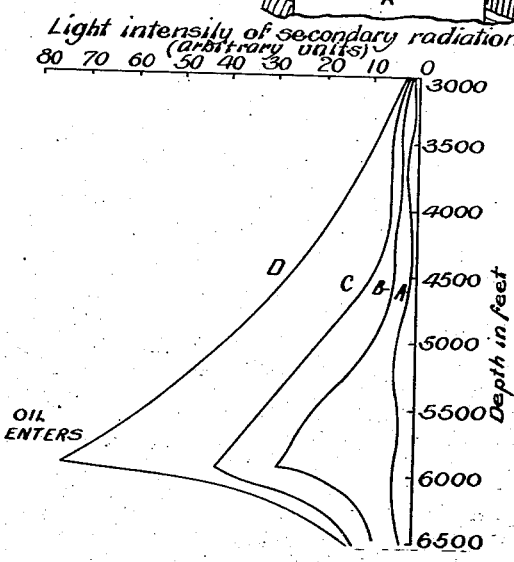
INVENTOR
Jacob Neufeld

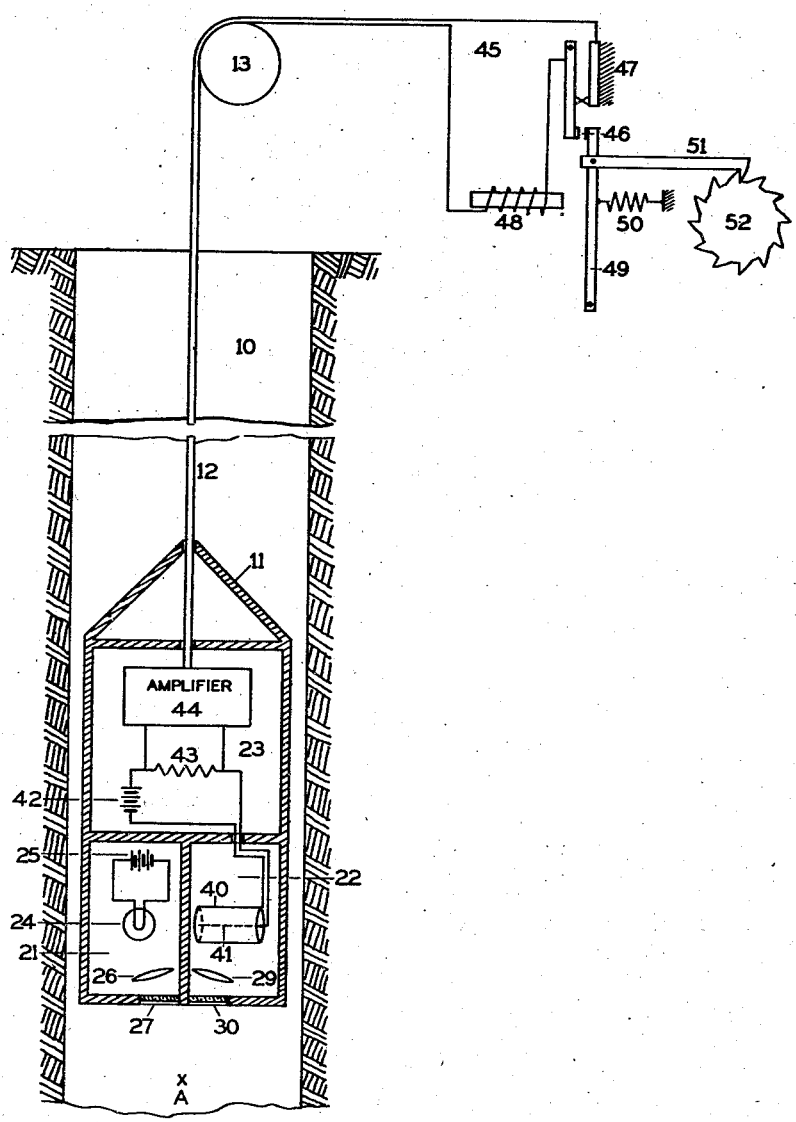

Patented May 6, 1941

2,241,154

UNITED STATES PATENT OFFICE 2,241,154

WELL SURVEYING METHOD AND APPARATUS

Jacob Neufeld, Tulsa, Okla., assignor to Well Surveys, Incorporated, Tulsa, Okla., a corporation of Delaware Application October 1, 1938, Serial No. 232,905

9 Claims. (Cl. 250—83)

My invention relates to a method for locating oil bearing strata in bore holes and the main object of the invention is to provide a means and method whereby the location of such oil bearing strata may be positively determined.

A further object of my invention is to provide a method whereby the character of the connate fluid in any fluid bearing stratum may be readily and accurately determined, thus locating the position of oil-bearing or gas-bearing sands.

In accordance with my invention the drill hole which is being surveyed should be properly conditioned in such a manner that oil present in oil bearing strata is allowed to enter the drill hole, thus providing within the drill hole a column of liquid presenting substantial difference in oil concentration between the liquid opposite the oil bearing strata and the rest of the liquid in the drill hole. Then the amount of oil concentration versus depth of the drill hole is automatically recorded by a suitable method which consists in quantitatively measuring a determined physical property having a direct relationship to the presence of oil in the liquid. The physical property which I have chosen to measure is the ability of the liquid to fluoresce when exposed to ultraviolet rays.

Most substances have the property of absorbing radiant energy, which is not lost, but is converted into either heat, chemical energy, or radiant energy of longer wavelengths. Thus, many substances radiate visible light through the conversion of radiant energy of wavelengths shorter than visible light into longer wavelengths within the visible spectrum. Fluorescence is the name of this phenomenon. It is well known that oils are characterized by the ability to produce fluorescent radiations and consequently by measuring the fluorescence of the liquid versus depth of the drill hole the depths may be determined which correspond to the ingress of oil from the oil bearing strata.

My invention involves both the structure and the method subjects matter.

In the drawings I have illustrated certain features involving the principle of my invention and have shown two embodiments thereof. Fig. 1 represents an arrangement according to my invention which includes a photoelectric cell. Fig. 2 represents a modified arrangement in which the photoelectric cell has been replaced by a photoelectric counter. Fig. 3 represents graphically some tests made according to my invention.

Referring now more particularly to Fig. 1 a drill hole 10 is shown penetrating the formation to be explored. It may be assumed that the drill hole is in an oil or gas field and intended to be a productive well.

The exploratory apparatus proper consists of a housing 11 which is lowered into the bore hole by means of a cable 12, containing insulated conductors. The cable has a length somewhat in excess of the length of the hole to be explored and is normally wound on a drum 13 positioned adjacent to the top of the drill hole. The cable may be unwound from the drum 13 to lower the exploring apparatus into the hole and may be rewound upon the drum to raise the exploring apparatus. Between the drum 13 and the hole there is a measuring reel 14 which is adjusted to roll on cable in such a manner that the number of revolutions of the reel corresponds to the amount of cable which has passed up or down in the drill hole. The reel is mounted on a shaft 15, and the motion of the shaft is transmitted through a gear box 16 to another shaft 17 which turns a spool 18 to wind a photographic film 19, the film being supplied from a feed spool 20.

The housing 11 of the exploratory apparatus comprises three parts respectively designated by the numerals 21, 22 and 23.

In the partition 21 I provide a source of ultraviolet light 24, a lens 26 and a light filter 27 positioned below the lens and sealing the lower end of the partition 21. The light filter has selective transmission characteristics and is adapted to transmit only ultraviolet light.

The partition 22 contains a photoelectric cell 28 with its light sensitive part facing downward, a lens 29 positioned in front of the cell and a light filter 30 sealing the lower end of the partition 22. The light filter 30 has selective transmission characteristics which are opposite to those of the filter 27. That is, the light filter absorbs ultraviolet radiations and passes visible radiations.

The partition 23 contains a battery 31, resistor 32 and an amplifier 33. The battery 31 supplies the voltage through the resistor 32 to the photocell 28. The terminals of the resistor 32 are connected to the input terminals of the amplifier 33 and the output terminals of the amplifier 33 are in turn connected to the cable 12 which conveys the current from the amplifier to a recording galvanometer 34 located at the surface of the earth.

The recording galvanometer 34 includes a moving coil 35 connected to the cable and a mirror 36 attached to the moving coil. The mirror is adapted to reflect a beam of light from a lamp 37 onto the sensitive film 19 to produce (after the film has been developed) a record of the indications transmitted from the amplifier 33.

For the satisfactory operation of my invention it is necessary to provide within the drill hole a column of liquid presenting substantial difference in oil concentration between the liquid opposite the oil bearing strata and the rest of the liquid in the drill hole. In many cases, however, the pressure in the oil bearing stratum is not high enough to force the oil into the hole in sufficient quantities to enable the point of intrusion to be detected when the hole is full of liquid owing to the high hydrostatic head. Therefore, in order to produce an appreciable flow of oil into the hole, the level of liquid in the hole is reduced by bailing.

When the liquid in the hole is at the desired level the exploring housing is lowered into the hole. As the apparatus is lowered through the muddy liquid, the lamp 24 continually projects by means of the lens 26 its image at a point A located at a fixed distance below the housing. It is noted that the radiations emitted by 24 are largely ultraviolet and that the filter 27 allows to pass only ultraviolet radiations into the liquid of the hole. Consequently the image of the radiating point at the lamp 24 and projected at the point A is made only of ultraviolet rays.

Part of the ultraviolet radiations emitted by 24 may, due to scattering in the liquid of the hole, be directed towards the filter 30. It is noted, however, that the filter 30 is capable of transmitting only visible radiations and absorbs ultraviolet radiations. Consequently none of these radiations are detected in the chamber 22.

However, as the detector is continually lowered within the drill hole and the point of the intrusion of oil is reached the liquid of the hole will show the ability to fluoresce, i. e. the ultraviolet rays imaging at the point A will produce visible radiations, the intensity of which will be an indication of the amount of oil concentration at the point A. These visible radiations are transmitted from the point A through the filter 30 and concentrate themselves by means of the lens 29 upon the photoelectric cell 28. Upon receiving the radiations the photoelectric cell becomes conductive and closes the electric circuit supplied by the battery 31 and containing the resistor 32. Then a voltage appears across the resistor 32 which is amplified in 33 and transmitted through the cable 12 to the recording galvanometer.

It is apparent that the resistance which the photoelectric cell offers to passage of current depends upon the amount of illumination and consequently the magnitude of the voltage across the resistor 32 is an indication of the amount of illumination of the photocell or of the amount of concentration of oil at A. The variations of the voltage across the resistor 32 are automatically recorded by the galvanometer 34 on the film 19 from which the point of intrusion of oil is thus readily ascertained.

Fig. 2 shows an arrangement illustrating another embodiment of my invention. In the arrangements of Fig. 2 and Fig. 1 the like elements have been denoted by the same numerals. Thus in Fig. 2 the exploring housing 11 contains three partitions 21, 22, 23 of which the partition 21 contains the source of ultraviolet light 24, the lens 26 and the filter 27 substantially the same as in Fig. 1.

The partition 22 contains in addition to the lens 29 and the filter 30 which are substantially the same as in Fig. 1, a photoelectric counter consisting of a gas electric discharge device having an outer cylindrical electrode 40 and an inner wire electrode 41 and containing inert gas under pressure. The photoelectric counters are well known in the art and combine the principles of the photocell and Geiger-Mueller counter. They provide the most sensitive means of detecting and measuring light.

The partition 23 contains a battery 42 in series with a resistor 43, the battery 42 supplying the voltage to the electrodes 40 and 41. The terminals of the resistor 43 are applied to the input of the amplifier 44. The output terminals of the amplifier are connected through the cable 12 to the recording apparatus 45 positioned adjacent the top of the drill hole.

In the recording apparatus the two conductors of the cable 12 are connected one to the other through switch 47 and electromagnet 48. The electromagnet 48, when excited by the current, attracts an armature 49 fitted with a restoring spring 50 causing a ratchet mechanism 51 to operate a counting mechanism indicated by a dial 52.

The operation of this arrangement is as follows:

The lamp 24 continually projects by means of the lens 26 its image at a point A located at a fixed distance below the housing. The filter 27 allows to pass only ultraviolet radiations and consequently the image A is made only of ultraviolet rays. The visible radiations excited by these ultraviolet rays and resulting from the fluorescence of oil particles present in the muddy liquid of the drill hole pass through the filter 30 and are focussed by means of the lens 29 upon the wire electrode 41 of the photoelectric counter. Each light quantum impinging upon the surface of the electrode may cause the emission of an electron which under the influence of the electric field due to the potential difference existing between the electrodes 40 and 41 acquires sufficient velocity to cause ionization by collision. An ionization current then passes between electrodes 40 and 41 traversing the circuit comprised by resistance 43, and battery 42. The resulting current is of short duration and sets up a potential impulse across the resistance 43. This current becomes amplified in 44 and transmitted to the top of the drill hole wherein it flows through the magnetic winding 48. It is apparent that when a current flows through the magnetic winding 48 the armature 49 is attracted and registers its movement on the dial 52. Towards the end of the movement of the armature the circuit is broken by the contact 47. The arrangement is then ready to respond to radiations which may subsequently enter the detector.

In such a manner the number of quanta of light energy which are emitted per second is determined by counting the current impulses they produced by means of the counter 52.

It is therefore apparent that I have provided a method and means for locating oil in various strata traversed by a drill hole.

By then making the measurements of fluorescence at different levels in the column of fluid, a true indication may be obtained of the connate fluid entering from each stratum. In order to more accurately locate the oil stratum, I prefer to perform a series of measuring operations on the column of liquid in the bore hole, the liquid being bailed out to a lower level after each measuring operation, the resultant measurements for different heights in the bore hole being plotted so as to give a series of check readings which eliminate accidental abnormalities, thereby giving a true indication of the location of the oil bearing strata or stratum.

The results of measurements corresponding to various levels of liquid in the bore hole are shown diagrammatically in Fig. 3. Referring now more particularly to Fig. 3, the vertical coordinates represent the depth of the bore hole in feet and the horizontal coordinates represent the light intensity of the secondary radiation (in arbitrary units), such as recorded by the recording galvanometer 34 when the housing 11 of the apparatus of Fig. 1 is lowered to the corresponding depths in the drill hole.

Curve A shown in the diagram has been obtained under conditions at which the hydrostatic pressure derived from the column of liquid in the drill hole was larger than the formation pressure of the oil bearing formation. Consequently no fluid is discharged from the oil bearing formation and there is no appearance of fluorescence in the neighborhood of this formation.

After the curve A was obtained the liquid level in the bore hole was reduced sufficiently to cause inflow of oil from the formation into the bore hole. Then a curve B, analogous to the curve A, was obtained. It is noted however, that the curve B shows a substantial increase of fluorescence at the depth of 6,000 feet corresponding to the ingress of oil.

After the curve B was obtained the liquid in the well was bailed out to a somewhat lower level and a series of measurements was taken at different depths giving a third series of readings which are plotted as indicated by curve C.

From the comparison of the curves C and B it is noted that by the time the curve C was obtained an area of appreciable dilution of oil in the liquid of the bore hole has been formed and has increased in size owing to the greater amount of oil that had come into the bore hole. It is seen that the area of dilution of oil had proceeded upwards thus reaching higher levels in the bore hole. The liquid in the bore hole is then bailed out to a further lower level and another series of readings is taken at different levels and another curve D is plotted. At each successive operation of this kind the amount of fluorescence present at corresponding points or levels in the bore hole increases owing to the continuous diffusion and flow of oil from the oil sands, but in addition to this effect there is found to be a very much sharper deflection of the zones of fluorescence corresponding to the location of the oil strata. It will be understood that the conditions as illustrated by the curves B, C, D are temporary ones, since the conditions of concentration of oil in the drill hole tends to become uniform and the required measurements must be carried out while the temporary condition of concentration persists. It is, however, apparent that by performing measurements under conditions as above described a series of check readings is obtained such as illustrated by the curves B, C and D which eliminate accidental abnormalities and give a true indication of the location of oil.

It may occur in some instances that the oil which it is desired to detect does not possess the ability to fluoresce or fluoresces to an extent which is insufficient for measuring purposes. In such cases I propose to add any of the substances possessing the ability of imparting fluorescence to oils. Such substances are well known in the art and some of them have been described in the U. S. patent specifications 1,708,563; 2,071,521; 2,074,288. Either of these substances is readily dissolved in the column of liquid of the drill hole. Then I propose to lower gradually the exploring instrument to various depths of the drill hole in order to register any indications and variation of fluorescence which may be recorded. It is apparent that this method enables me to detect oils which do not possess the ability to fluoresce but which are capable of fluorescing when mixed with proper substances.

Having fully described the perfected embodiment of my invention it is to be understood that I do not wish to limit myself to the exact description herein set forth which may obviously be varied in detail without departing from the spirit of my invention but only as set forth in the appended claims.

In the claims the term "light" or the term "luminous energy" is meant to include visible light as well as invisible light, such as ultraviolet and infrared light, the said invisible light being incapable of affecting the average normal retina, but having the property of luminous energy. Thus I wish to include in my definition of light or luminous energy the visible light covering the range between about $4 \times 10^{-5}$ cm., for the extreme violet and $7.2 \times 10^{-5}$ cm. I wish also to include in my definition of light or luminous energy, radiations shorter than that of the visible light and termed ultraviolet light down to a wavelength of about $5 \times 10^{-7}$ cm. I wish also to include in my definition of light or luminous energy, radiations longer than that of the visible light and termed infrared light up to a wave length of about $4 \times 10^{-2}$ cm.

I claim:

1. A method of determining the nature of formations penetrated by drill holes and the like that comprises measuring the fluorescence of substances persent in the earth penetrated by a drill hole at a measured depth, repeating the measurement on the substances present at other measured depths and mechanically correlating the measurements of depth with the measurements of fluorescence to give a graphic comparison of the variation in fluorescence over a range of depths.

2. A method of determining the nature of formations penetrated by drill holes and the like that comprises measuring the luminous fluorescence to ultra violet light of substances present in the earth penetrated by a drill hole at a measured depth, repeating the measurement on the substances present at other measured depths and mechanically correlating the measurements of depth with the measurements of fluorescence to give a graphic comparison of the variation in fluorescence over a range of depths.

3. A method of determining the nature of formations penetrated by drill holes and the like that comprises measuring by recording electrical means, at a selected depth, the fluorescence of substances present in the earth penetrated by the drill hole at that depth, repeating the measurement at other depths in the drill hole and mechanically correlating the measurements of depth with the records of fluorescence to give a graphic record of the fluorescence related to depth.

4. A method of determining the nature of formations penetrated by drill holes and the like that comprises measuring, at a measured depth in a drill hole filled with liquid, which liquid is essentially comprised of liquid that has flowed from the formation into the drill hole and not moved vertically in the drill hole to any substantial extent, the luminous fluorescence of the liquid in the drill hole at that depth, repeating the measurement at other depths in the drill hole under similar conditions and correlating the measurements of depth with the measurements of fluorescence to give a comparison of the variation in fluorescence over a range of depths.

5. Apparatus for determining the nature of formations penetrated by drill holes and the like that comprises a casing adapted to be lowered into the drill hole, means in said casing to measure the luminous fluorescence of substances encountered in the hole, a cable for supporting said casing in the hole and conducting the results of the measurements to the surface in the form of electrical signals, means for measuring the depth at which the casing is located and means for correlating the measurements of depth with the measurements of fluorescence.

6. Apparatus for determining the nature of formations penetrated by drill holes and the like that comprises a casing adapted to be lowered into the drill hole, means in said casing to measure the luminous fluorescence of substances encountered in the hole including a source of light, means to direct the light outwardly from the casing and means to measure the fluorescence caused thereby, a cable for supporting said casing in the hole and conducting the results of the measurements to the surface in the form of electrical signals, means for measuring the depth at which the casing is located and means for correlating the measurements of depth with the measurements of fluorescence.

7. Apparatus for determining the nature of formations penetrated by drill holes and the like that comprises a casing adapted to be lowered into the drill hole, means in said casing to measure the luminous fluorescence of substances encountered in the hole including a source of ultra violet light, means to direct the light outwardly from the casing and means to measure the fluorescence caused thereby, a cable for supporting said casing in the hole and conducting the results of the measurements to the surface in the form of electrical signals, means for measuring the depth at which the casing is located and means for correlating the measurements of depth with the measurements of fluorescence.

8. Geophysical exploration process comprising the steps of projecting ultraviolet radiation upon substances including fluorescent material present at a measured depth in the earth penetrated by a drill hole, measuring the intensity of fluorescence so produced, converting the fluorescence-measurements into proportionally related electrical currents; repeating said steps upon substances present at other measured depths; and mechanically correlating measurements of the electrical currents with depth measurement to provide a record of fluorescence-variation related to depth.

9. Method of geophysical exploration which comprises the steps of projecting ultraviolet radiations upon substances including fluorescent materials in the earth penetrated by a drill hole, measuring at a determined depth the intensity of fluorescence so produced, converting the measurements at the place of measurement into proportionally related electrical currents; repeating said steps at other determined depths; and mechanically correlating measurements of the electrical currents with depth measurement to provide a record of fluorescence-variation related to depth.

JACOB NEUFELD.